(12) United States Patent
Corbo

(10) Patent No.: US 12,722,676 B2
(45) Date of Patent: Sep. 1, 2026

(54) GRADE CROSSING SYSTEM INCLUDING GRADE CROSSING PREDICTOR IN ELECTRIFIED PROPULSION TERRITORY

(71) Applicant: Siemens Mobility, Inc., New York, NY (US)

(72) Inventor: Mark Corbo, Prospect, KY (US)

(73) Assignee: Siemens Mobility, Inc., New York, NY (US)

(*) Notice: Subject to any disclaimer, the term of this patent is extended or adjusted under 35 U.S.C. 154(b) by 440 days.

(21) Appl. No.: 18/536,681

(22) Filed: Dec. 12, 2023

(65) Prior Publication Data

US 2025/0187496 A1 Jun. 12, 2025

(51) Int. Cl.

| | |
|---|---|
| ***B61L 29/32*** | (2006.01) |
| ***B60M 5/00*** | (2006.01) |
| ***B60M 5/02*** | (2006.01) |
| ***B61L 1/18*** | (2006.01) |
| ***B61L 1/20*** | (2006.01) |
| ***B61L 29/22*** | (2006.01) |
| ***B61L 29/28*** | (2006.01) |
| ***B61L 29/30*** | (2006.01) |

(52) U.S. Cl.

CPC ............... *B61L 29/32* (2013.01); *B60M 5/00* (2013.01); *B60M 5/02* (2013.01); *B61L 1/187* (2013.01); *B61L 1/20* (2013.01); *B61L 29/226* (2013.01); *B61L 29/28* (2013.01); *B61L 29/30* (2013.01)

(58) Field of Classification Search

CPC ........ B61L 29/32; B61L 1/187; B61L 29/226; B61L 29/28; B61L 29/30; B61L 1/181; B61L 1/20; B60M 5/00; B60M 5/02

See application file for complete search history.

(56) References Cited

U.S. PATENT DOCUMENTS 3,838,271 A * 9/1974 Ackard ................. B61L 29/286 246/28 F
3,929,307 A * 12/1975 Geiger .................... B61L 1/187 246/130
4,365,777 A * 12/1982 Geiger .................. B61L 29/226 246/130

(Continued)

FOREIGN PATENT DOCUMENTS

CN 107867308 A * 4/2018 .............. B61L 1/181
CN 110784847 A * 2/2020 ......... H04L 41/0663

(Continued)

OTHER PUBLICATIONS

Siemens et al: "Microprocessor Based Simple Grade Crossing Predictor 4000 / Motion Sensor 4000 (SGCP4000 / MS4000), P/N A80490 & P/N A80495", 1-15, Jan. 1, 2016 (Jan. 1, 2016), pp. 1-218, XP093000111, Retrieved from the Internet: URL:https://assets.new.siemens.com/siemens /assets/api/uuid:be44ea51-61fe-4621-ba60-44552bd6e877/version:1565620225/ms-4000-ins truction-and-installation-manual.pdf.

(Continued)

*Primary Examiner* — Cheng Lin

(57) ABSTRACT

A grade crossing system includes a track circuit with a grade crossing predictor (GCP) in electrified propulsion territory, and at least one filter configured to attenuate or eliminate electromagnetic interference (EMI) occurring in the electrified propulsion territory.

14 Claims, 5 Drawing Sheets

(56) References Cited

U.S. PATENT DOCUMENTS 5,265,831 A * 11/1993 Muller .................. B61L 29/224
246/270 R
8,505,855 B2 * 8/2013 Kikuchi .................. B61L 1/187
246/122 R
8,668,169 B2 * 3/2014 Nichter ................. B61L 25/025
246/125
8,899,530 B2 * 12/2014 Hogan .................. B61L 29/226
701/19
10,017,197 B2 * 7/2018 O'Dell .................... B61L 29/32
11,827,260 B2 * 11/2023 Corbo ..................... B61L 1/187

FOREIGN PATENT DOCUMENTS

CN 111347943 A * 6/2020 .............. B60M 5/00
CN 113341701 A * 9/2021 ............. G05B 11/42
WO WO-2019147306 A1 * 8/2019 ............. G01S 17/88

OTHER PUBLICATIONS

Joos G et al: "Electromagnetic Interference Issues in the Specificationof AC and DC Propulsion Systems for Light Rail Vehicles", Proceedings of the 1998 IEEE/ASME Joint Railroad Conference. Philadelphia, PA, Apr. 15-16, 1998; [Proceedings of the IEEE/ASME Joint Railroad Conference], New York, NY: IEEE, US, Apr. 15, 1998 (Apr. 15, 1998), pp. 41-47, XP000793218, ISBN: 978-0-7803-4853-0 p. 43.

* cited by examiner

FIG 1
PRIOR ART

GCP System

Control Unit 300
310
Recorder 316
Memory 324
Processor Unit 312
Display 314
Track Circuit Interface 318
Lamp and Gate Interface 320
External equipment, such as filter(s) 350
Railroad Signal System(s) 390
Filter for track circuit filtering 330
Track Circuit 322
380
360
370

400
410
RCV1
RCV2
XMT1
XMT2
CMX1
CMX2
1
2
5
6
3
4
RD
BK
432
422
434
430-A
430-B
A
C
E
MOUNTED IN CABINET
420
440
450

GRADE CROSSING SYSTEM INCLUDING GRADE CROSSING PREDICTOR IN ELECTRIFIED PROPULSION TERRITORY

BACKGROUND

1. Field

Aspects of the present disclosure generally relate to applications of a grade crossing predictor in electrified propulsion territory, more specifically in connection with electric locomotives and trains.

2. Description of the Related Art

A constant warning time device, also referred to as a grade crossing predictor in the U.S. or a level crossing predictor in the U.K., is an electronic device that is connected to rails of a railroad track and is configured to detect presence of an approaching train and determine its speed and distance from a crossing, i.e., a location at which the tracks cross a road, sidewalk or other surface used by moving objects. The constant warning time device is configured to use this information to generate a constant warning time signal for controlling a crossing warning device. A crossing warning device is a device that warns of the approach of a train at a crossing, examples of which include crossing gate arms, crossing lights, and/or crossing bells or other audio alarm devices. Constant warning time devices are often (but not always) configured to activate the crossing warning device at a fixed time (e.g., 30 seconds) prior to an approaching train arriving at a crossing.

Typical constant warning time devices include a transmitter that transmits a signal over a circuit formed by the track's rails and one or more termination shunts positioned at desired approach distances from the transmitter, a receiver that detects one or more resulting signal characteristics, and a logic circuit such as a microprocessor or hardwired logic that detects the presence of a train and determines its speed and distance from the crossing. The approach distance depends on the maximum allowable speed of a train, the desired warning time, and a safety factor. Preferred embodiments of constant warning time devices generate and transmit a constant current AC signal on said track circuit. Constant warning time devices detect a train and determine its distance and speed by measuring impedance changes caused by the train's wheels and axles acting as a shunt across the rails, which effectively shortens the length, and hence lowers the impedance, of the rails in the circuit. Multiple constant warning devices can monitor a given track circuit if each device measures track impedance at a different frequency.

Historically, applying grade crossing predictor systems in electrified propulsion territory, e. g. in connection with electric locomotives and trains, has been avoided, for example due to electrical interferences between the track circuit, which is an electrical system, and the environment of electric locomotives. However, due to the advanced technologies available today, grade crossing predictor applications in electrified propulsion territory are possible.

SUMMARY

Briefly described, aspects of the present disclosure relate to applications of constant warning time devices in electrified propulsion territory, more specifically in connection with electric locomotives. Constant warning time devices are herein also referred to as grade crossing predictor (GCP) or grade crossing predictor system (GCP system).

Generally, a grade crossing system is provided that is configured to operate in electrified propulsion territory, which allows for constant warning time operation including timeout. The grade crossing system includes additional external equipment.

More specifically, an aspect of the present disclosure provides a grade crossing system, comprising a track circuit comprising a grade crossing predictor (GCP) in electrified propulsion territory, and at least one filter configured to attenuate or eliminate electromagnetic interference (EMI) occurring in the electrified propulsion territory.

BRIEF DESCRIPTION OF THE DRAWINGS

FIG. 1 illustrates an example grade crossing system in accordance with embodiments disclosed herein.

DETAILED DESCRIPTION

Figure 2:
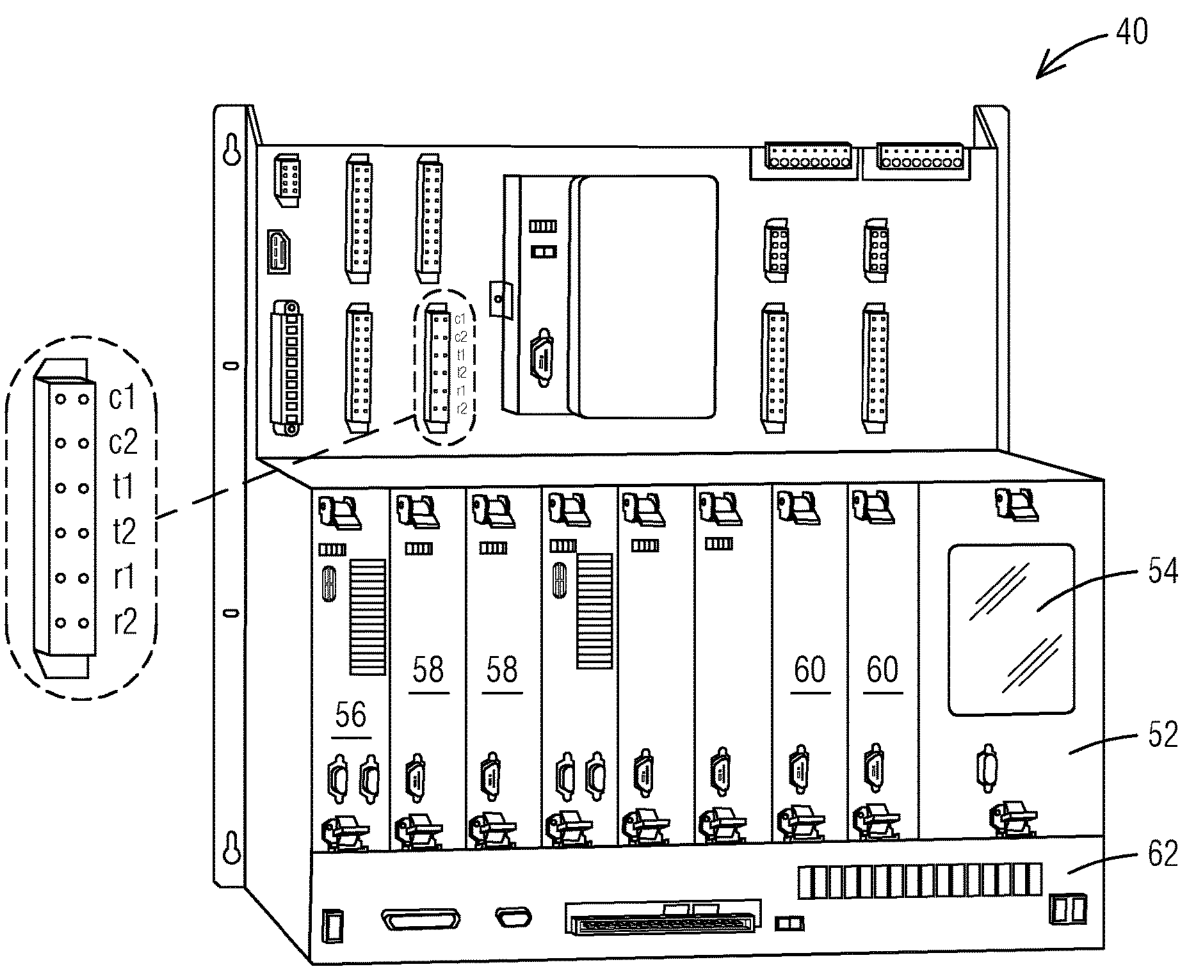
FIG. 2 illustrates an example constant warning time device (GCP) in accordance with an embodiment disclosed herein.

To facilitate an understanding of embodiments, principles, and features of the present disclosure, they are explained hereinafter with reference to implementation in illustrative embodiments. In particular, they are described in the context of grade crossing systems including a GCP and at least one filter configured to attenuate or eliminate electrical interferences.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
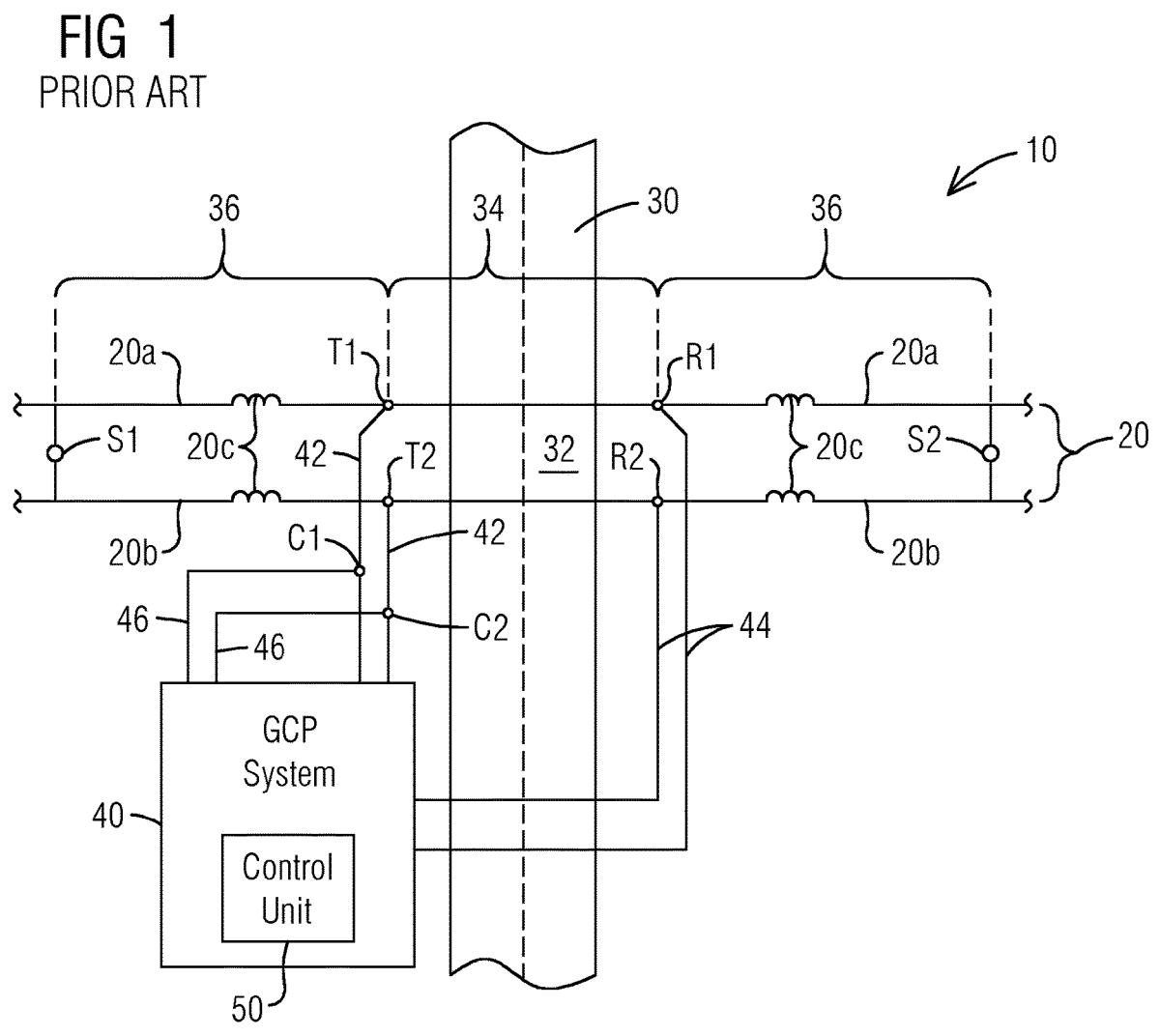

FIG. 1 illustrates a known grade crossing system 10 in accordance with embodiments disclosed herein. The grade crossing system 10 is installed at a location wherein road 30 crosses railroad track 20. The crossing of the road 30 and the railroad track 20 forms an island 32.

The railroad track 20 includes two rails 20*a*, 20*b* and a plurality of ties that are provided over and within railroad ballast (not shown in FIG. 1) to support the rails 20*a* and 20*b*. The rails 20*a*, 20*b* are shown as including inductors 20*c*. The inductors 20*c*, however, are not separate physical devices but rather are shown to illustrate the inherent distributed inductance of the rails 20*a*, 20*b*.

The system 10 includes a constant warning time device 40, also referred to as GCP 40, that comprises a transmitter that connects to the rails 20*a*, 20*b* at transmitter connection points T1, T2 on one side of the road 30 via transmitter wires 42. The GCP 40 also comprises a main receiver that connects to the rails 20*a*, 20*b* at main receiver connection points R1, R2 on the other side of the road 30 via receiver wires 44. The receiver wires 44 are also referred to as main channel receiver wires.

The GCP 40 further comprises a check receiver that connects to the rails 20*a*, 20*b* at check receiver connection points C1, C2 via check channel receiver wires 46. The check channel receiver wires 46 are connected to the track 20 on the same side of the road 30 as the transmitter wires 42, resulting in a six-wire system. The main channel receiver and check channel receiver operate in much the same manner with an incoming train, providing a parallel check of the main channel operation. Those of ordinary skill in the art will recognize that the transmitter and receivers (main channel receiver and check channel receiver), other than the physical conductors that connect to the track 20, are often co-located in an enclosure located on one side of the road 30. The GCP 40 includes a control unit 50 connected to the transmitter and receivers. The control unit includes logic, which may be implemented in hardware, software, or a combination thereof, for calculating train speed, distance, and direction, and producing constant warning time signals for the crossing.

Also shown in FIG. 1 is a pair of termination shunts S1, S2, one on each side of the road 30 at a desired distance from the center of the island 32, e. g., 3000 feet. It should be appreciated that FIG. 1 is not drawn to scale and that both shunts S1, S2 are approximately the same distance away from the center of the island 32. The termination shunts S1, S2 can be embodied for example as narrow band shunts (NBS).

FIG. 1 further illustrates an island circuit 34 which is the area between transmitter connection points T1, T2 and main receiver connection points R1, R2. For example, the GCP 40 monitors the island circuit 34 as well as approach circuits 36 which lie to the right and left of the island circuit 34, i.e., between the island circuit 34 and the termination shunts S1, S2.

Typically, the shunts S1, S2 and the associated GCP 40 are tuned to the same frequency. This way, the transmitter can continuously transmit one AC signal having one frequency, the receiver can measure the voltage response of the rails 20*a*, 20*b* and the control unit 50 can make impedance and constant warning time determinations based on the one specific frequency. When an approaching train crosses one of the termination shunts S1, S2, the train's wheels and axles act as shunts, which lowers the inductance, impedance and voltage measured by the corresponding control unit 50. Measuring the change in the impedance indicates the distance of the train and measuring the rate of change of the impedance (or integrating the impedance over time) allows the speed of the train to be determined.

FIG. 2 illustrates an example GCP 40 in accordance with embodiments disclosed herein. The GCP 40 is typically enclosed within a weatherproof bungalow or housing and in general proximity to at least one of the railroad tracks 20. The GCP 40 is an integrated system that includes all the control, train detection, recording and monitoring functions for the grade crossing system 10 shown in FIG. 1.

The GCP 40 includes a plurality of modules. One of these modules is a display module 52 with a display 54. Display 54 can be a touch screen display that provides a user interface, for example for initial setup, calibration and troubleshooting of the GCP 40. Other modules may include a central processing unit (CPU) 56, track modules 58 for monitoring each track, crossing control modules 60 for controlling traffic warning gates, and a recorder module 62 for recording events and conditions at the system 10.

Each of the modules may have external connectors, test points and lighted indicators. For example, each track module 58 comprises transmitter connection pins t1, t2, main receiver connection pins r1, r2, and check receiver connection pins c1, c2.

Figure 3:
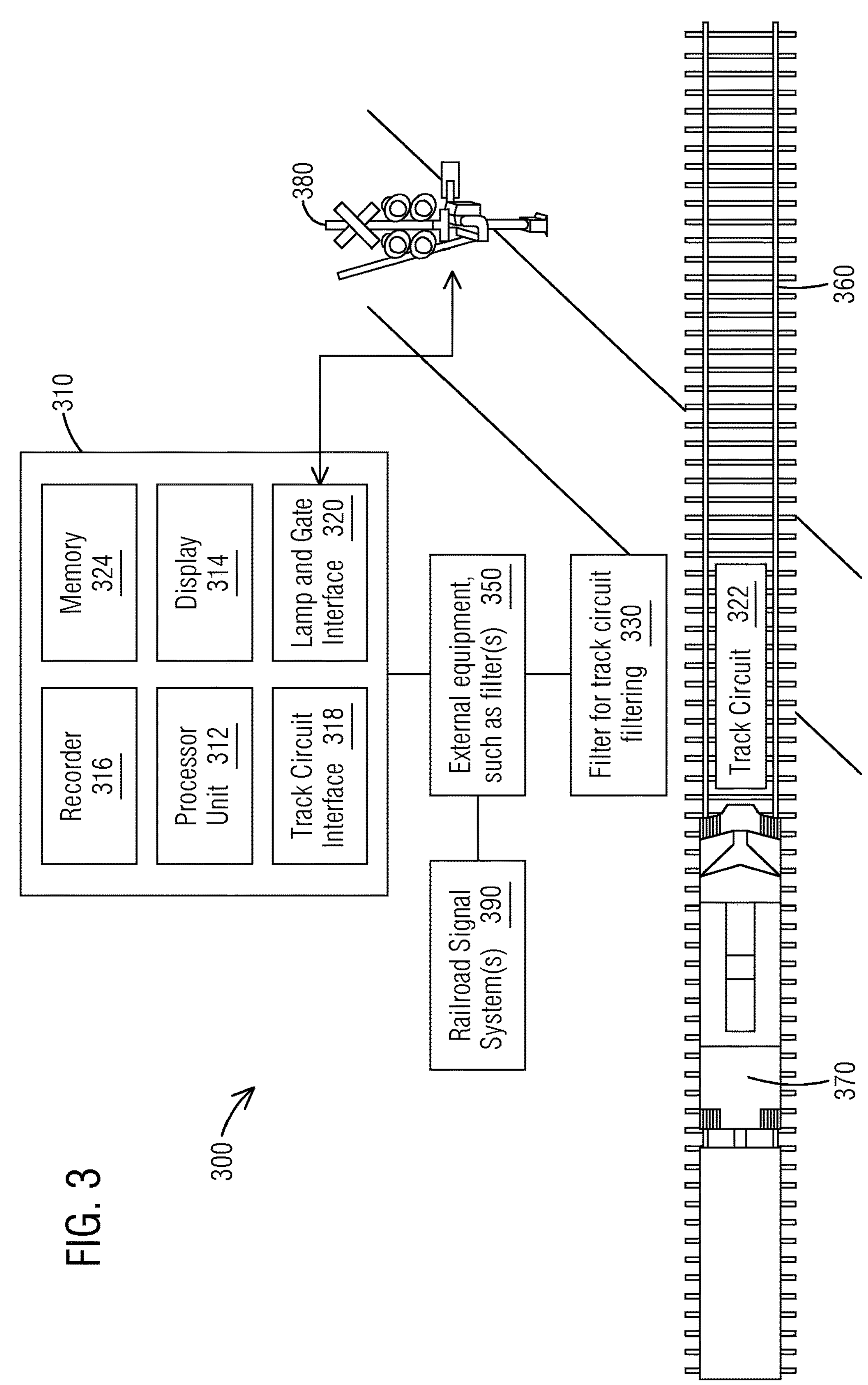
FIG. 3 illustrates a diagram of a grade crossing system in accordance with an exemplary embodiment of the present disclosure.

FIG. 3 illustrates a diagram of a grade crossing system 300 in accordance with an exemplary embodiment of the present disclosure.

The grade crossing system 300 comprises a GCP 310 including various components, such as control/processor unit 312, memory 324 including software instructions, display 314, recorder 316, track circuit interface 318 and lamp-gate interface 320, as well as track circuit(s) 322 with transmitter(s), receiver(s), termination shunts etc. Generally, the GCP 310 is configured as described with reference to FIG. 1 and FIG. 2. Further, railroad signal system(s) 390 are schematically shown. Railroad signal system (railway signaling) is used to control movement of railway traffic.

As previously described, the system 300, via track circuit interface 140, activates a transmitter that transmits a signal over the track circuit 322. The track circuit 322 is formed by the track's rails, schematically shown by track 360, and one or more termination shunts (not shown) positioned at desired approach distances from the transmitter, also referred to as approach lengths. The signal transmitted by the transmitter is for example electric current in the rails. A receiver detects one or more resulting signal characteristics, and a logic circuit, such as the processor unit 312, detects presence of train 370 and determines the train's speed and distance from the grade crossing 380. The approach length depends on a maximum allowable speed (MAS) of the train 370, a desired warning time (WT), and a safety factor. The system 300 will use this information to generate warning signal(s) for warning devices such as lamp(s) and gates(s) at the crossing 380, utilizing the processor unit 312 in combination with software instructions stored in memory 324. The crossing warning device(s) are typically activated at a fixed time, e. g. warning time, which can be for example 30 seconds, prior to the approaching train 370 arriving at the grade crossing 380.

The train is an electric train, for example includes an electric locomotive 370. An electric locomotive 370 is a locomotive powered by electricity from overhead lines (catenary), a third rail or on-board energy storage such as a battery or a supercapacitor. Electric locomotives 370 (trains) benefit from the high efficiency of electric motors. Additional efficiency can be gained from regenerative braking, which allows kinetic energy to be recovered during braking to put power back on the line. Newer electric locomotives use alternating current (AC) motor-inverter drive systems that provide for regenerative braking. Electric locomotives 370 are quiet compared to diesel locomotives since there is no engine and exhaust noise and less mechanical noise. The lack of reciprocating parts means electric locomotives are easier on the track, reducing track maintenance.

As noted, applying grade crossing predictor systems 300 in electrified propulsion territory, e. g. in connection with electric locomotives 370 and trains, has been avoided, for example due to electrical interferences between the track circuit, which is an electrical system, and the environment of electric locomotives.

In accordance with an exemplary embodiment of the present disclosure, a grade crossing system 300 is provided that is configured to operate in electrified propulsion territory, which allows for constant warning time operation including timeout. The grade crossing system 300 includes additional external equipment 350.

More specifically, the grade crossing system 300 comprises the GCP 310 in electrified propulsion territory, specifically alternating current (AC) electrified territory, and one or more filters, e. g., external equipment 350, configured to attenuate or eliminate electromagnetic interference (EMI) which occurs in the electrified propulsion territory. Signal and communication systems in AC electrified territory must withstand substantial interference effects produced for example by current flowing in the catenary and the use of the rails to return the propulsion current.

The EMI originates from different areas, such as the electric locomotive 370 and the signal systems 390. The EMI from the electric locomotive 370 includes propulsion current frequency emissions from traction motors and vehicle current frequency emissions from internal control equipment in the locomotive or train. The EMI from the on-track signaling system 390 comprises current frequency emissions from impedance bonds, propulsion return circuits, cab signaling systems and train-to-wayside communication (TWC) systems, etc.

The described embodiments and solutions are designed to facilitate operation of the GCP 310 in a complex application with many sources of electrical interference, e. g., EMI. In exemplary embodiments, one or more filters 330 are used and installed external to the GCP 310 to attenuate or eliminate the interferences.

The following examples may be used in full or in part based on local conditions. Further, they are not listed in any order.

Track Circuit Filtering

According to an exemplary embodiment, track circuit filtering is provided. As illustrated in FIG. 3, one or more filters 330 are installed between the railroad signal systems 390 and the track 360 to provide filtering with respect to the track circuit 322. Track circuit filtering and the filters 330 may include track circuit isolation devices, such as an AC code isolation unit, for example 100 Hz AC code isolation unit. The filters 330 comprise a higher current capability designed to operate in high voltage and current applications such as electrified propulsion.

Multiple Filter Application

Figure 4:
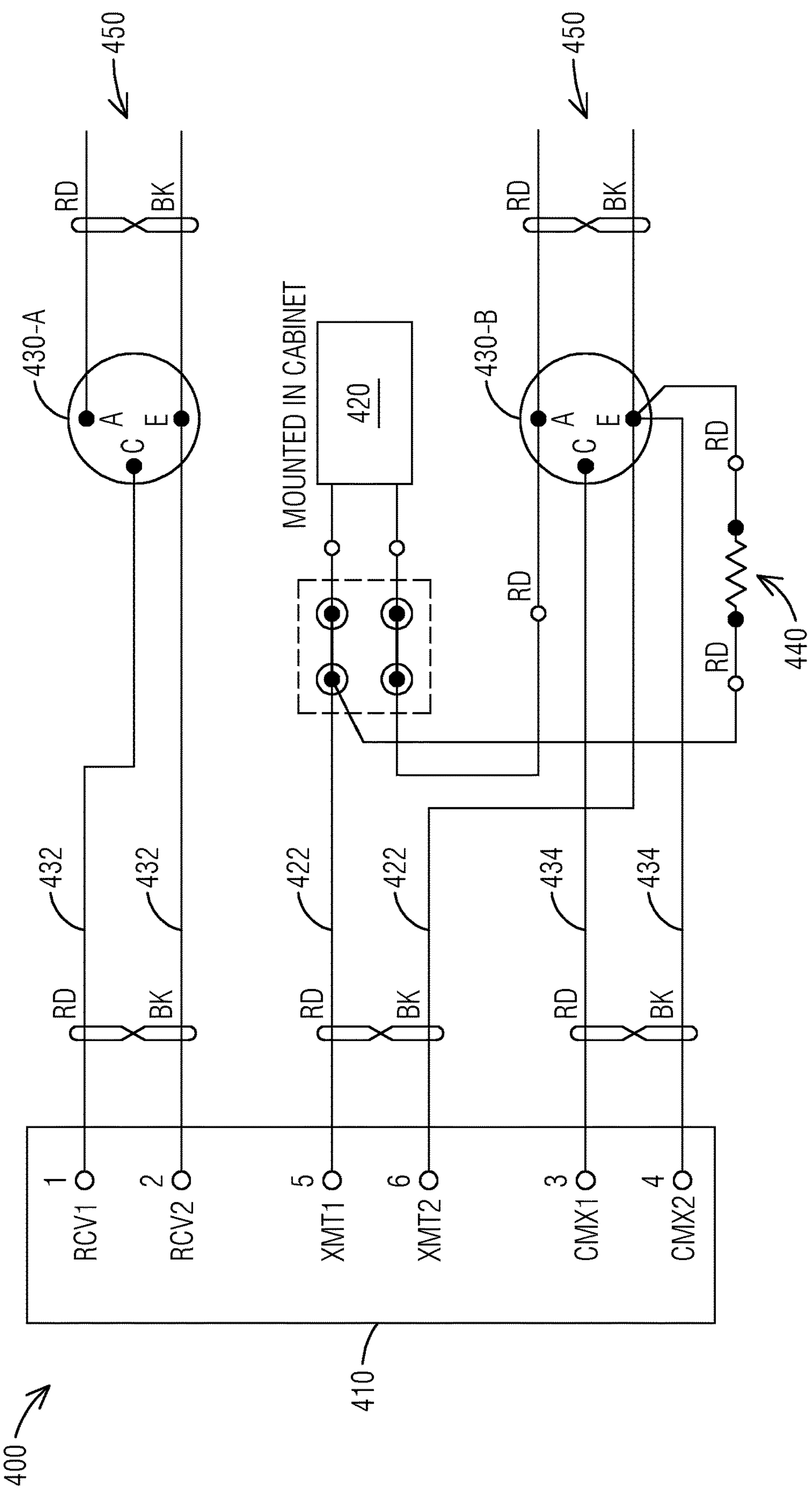
FIG. 4 illustrates a schematic diagram of a multiple filter application in accordance with an exemplary embodiment of the present disclosure.

FIG. 4 illustrates a schematic diagram of a multiple filter application 400 in accordance with an exemplary embodiment of the present disclosure.

According to an exemplary embodiment, multiple filter application(s) are provided. The exemplary multiple filter application 400 comprises multiple filters installed and applied with respect to the GCP 310, more specifically with respect to one or more track modules 410 of the GCP 310 (see also track modules 58 as illustrated in FIG. 2).

For example, the track module 410 comprises transmitter connection pins XMT1, XMT2, main receiver connection pins RCV1, RCV2, and check receiver connection pins CHC1, CHC2. Track connections 450 are shown in the opposite site of the track module 410.

A filter 420 is installed and applied with respect to the transmitter connections/wires 422. The filter 420 is mounted in the cabinet/bungalow where the GCP system 310 is mounted. The filter 420 can be an EMI line filter.

Further filters 430-A, 430-B are installed and provided with respect to the receiver connections/wires 432 and the check receiver connections/wires 434. The receiver wires 432, 434 may comprise the filters 430-A, 430-B, or the filters 430-A, 430-B are installed between the receiver wires 432, 434 and the tracks, or the filters 430-A, 430-B are installed on the tracks at the location where the receiver wires 432, 434 are connected to the tracks. In connection with filter 430-B, a resistor arrangement 440 is provided. The filters 430-A and 430-B can be for example frequency-receiver filters.

Cab Signal Filtering

Figure 5:
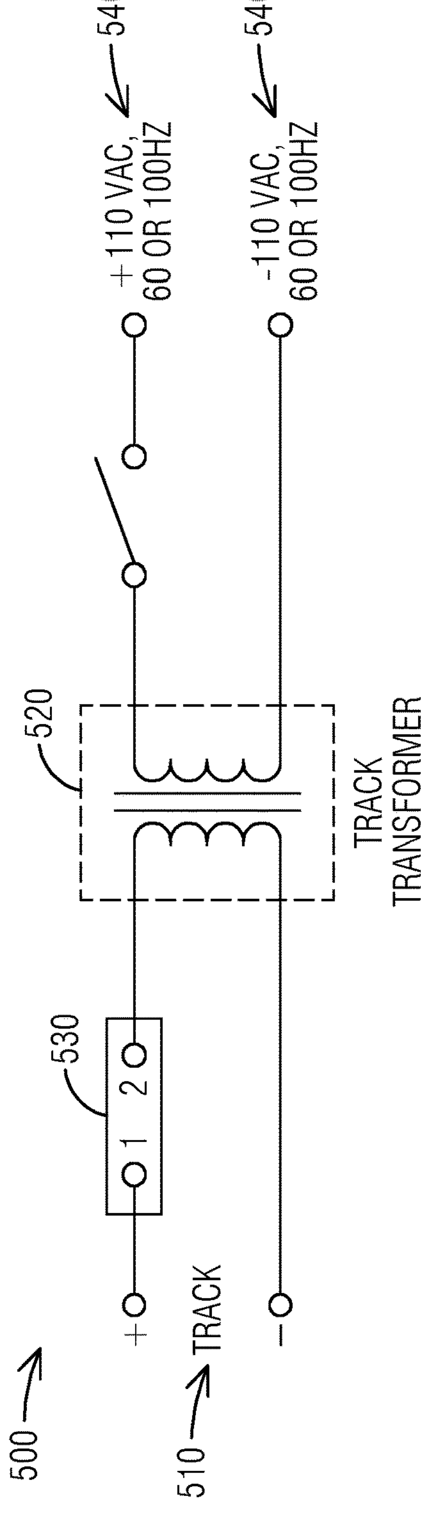
FIG. 5 illustrates a schematic diagram of a cab signal filtering application in connection with an exemplary embodiment of the present disclosure.

FIG. 5 illustrates a schematic diagram of a cab signal filtering application 500 in connection with an exemplary embodiment of the present disclosure.

Cab signaling is a railway safety system that communicates track status and condition information to the cab, crew compartment or driver's compartment of a locomotive, railcar, or a multiple unit (see for example locomotive 370 in FIG. 3). Cab signals require a means of transmitting information from wayside to train. There are a few main methods to accomplish the information transfer. Electric or magnetic systems use the presence of a magnetic field or electric current to designate hazardous conditions. Inductive system are non-contact systems that rely on more than the simple presence or absence of a magnetic field to transmit a message.

A coded track circuit-based system is essentially an inductive system that uses the running rails as information transmitter. The coded track circuits serve a dual purpose: to perform the train detection and rail continuity detection functions of a standard track circuit, and to continuously transmit signal indications to the train. The coded track circuit systems eliminate the need for specialized beacons.

In an exemplary embodiment of the present disclosure, in the cab signal filtering application 500, a 60 Hz or 100 Hz cab signal 540 may be used. The cab signal 540 is transmitted via track transformer 520 to the rails/track 510. The cab signal filtering application 500 includes filter 530 installed along the track 510, wherein the filter 530 can be for example a 60 Hz or 100 Hz signal filter.

Shunt Application on Track at Insulated Joints

Figure 6:
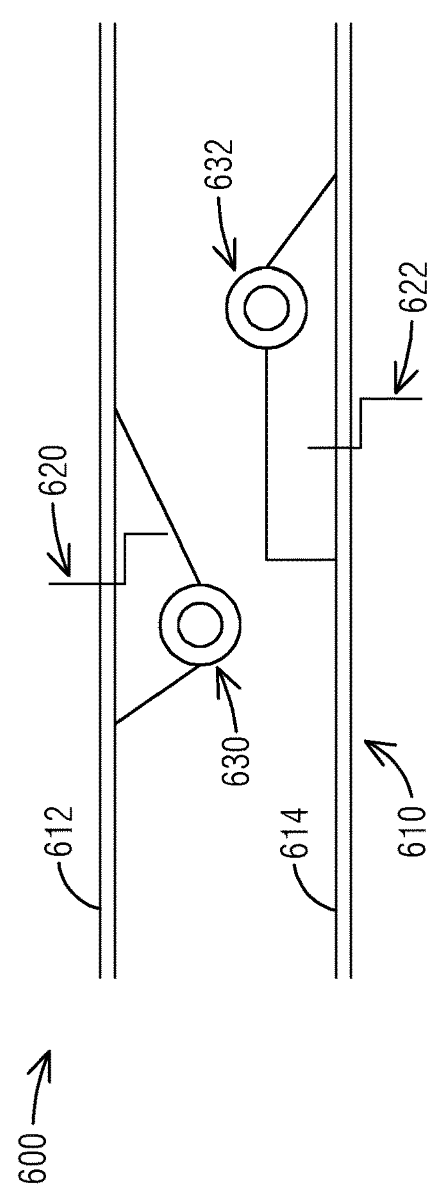
FIG. 6 illustrates a schematic diagram of a shunt application on track at insulated joints in accordance with an exemplary embodiment of the present disclosure.

FIG. 6 illustrates a schematic diagram of a shunt application 600 on track at insulated joints in accordance with an exemplary embodiment of the present disclosure.

Termination shunt application 600 illustrates track 610 with rails 612, 614 and insulated joints 620, 622. Insulated joints, such as insulated joints 620, 622, are placed in the rails 612, 614 to electrically isolate adjacent track circuits.

In an exemplary embodiment of the present disclosure, the application 600 comprises termination shunts 630, 632, which can be for example 50 Hz or 60 Hz narrow band shunts. The shunts 630, 632 are designed to function as filters for specific frequencies, e. g., 50 Hz or 60 Hz.

The described filters 330, 430, 530 and shunts 630, 632 comprise a higher current capability designed to operate in high voltage and current applications such as electrified propulsion.

In another exemplary embodiment of the present disclosure, physical changes may be made to the GCP, such as GCP 310 of FIG. 3 or GCP 40 of FIG. 2. Such changes to the GCP may include application software changes on the control unit (CPU module), and changes to the respective track module. Changes of the track module may include:

- Transmitter changes to support higher voltage operation, for example up to 20 volts on track circuit.
- Modify Vx power supply to support higher voltage operation, for example up to 10 volts.
- Receiver changes include change operation of digital filters to improve compatibility with electrified environment, accomplished by changing value of scaling resistors and scaling resistors change the algorithm for the digital filters.

While embodiments of the present disclosure have been disclosed in exemplary forms, it will be apparent to those skilled in the art that many modifications, additions, and deletions can be made therein without departing from the spirit and scope of the disclosure and its equivalents, as set forth in the following claims.

The invention claimed is:

1. A grade crossing system, comprising:

a track circuit comprising a grade crossing predictor (GCP) in electrified propulsion territory, and at least one filter configured to attenuate or eliminate electromagnetic interference (EMI) occurring in the electrified propulsion territory, wherein the EMI originates from an electric locomotive or train and from an electrically powered on-track signaling system.

2. The grade crossing system of claim 1, wherein the EMI from the electric locomotive includes propulsion current frequency emissions from traction motors and vehicle current frequency emissions from internal control equipment.

3. The grade crossing system of claim 1, wherein the EMI from the electrically powered on-track signaling system comprises current frequency emissions from impedance bonds, propulsion return circuits, cab signaling systems and train-to-wayside communication (TWC) systems.

4. The grade crossing system of claim 1, wherein the at least one filter is external to the GCP.

5. The grade crossing system of claim 1, wherein the GCP comprises a track module, and wherein the at least one filter comprises multiple filters arranged between the track module and connection points at rails of a track.

6. The grade crossing system of claim 5, wherein the GCP comprises a transmitter with transmitter wires connected between transmitter pins of the track module and transmitter connection points at the rails of the track, wherein the transmitter comprises an EMI line filter.

7. The grade crossing system of claim 5, wherein the GCP comprises a receiver with receiver wires connected between receiver pins of the track module and receiver connection points at the rails of the track, wherein the receiver comprises a filter arranged between the track module and receiver connection points.

8. The grade crossing system of claim 6, wherein the GCP comprises a check receiver and check receiver wires, wherein the check receiver comprises a filter arranged between the track module and check receiver connection points, in connection with resistors.

9. The grade crossing system of claim 1, comprising track circuit filtering, wherein the at least one filter is installed between the track circuit and a railroad signal system.

10. The grade crossing system of claim 9, wherein the at least one filter comprises an AC code isolation unit.

11. The grade crossing system of claim 1, comprising cab signal filtering, wherein the at least one filter is installed in connection with a cab signal system.

12. The grade crossing system of claim 11, wherein the at least one filter comprises an AC code isolation unit.

13. The grade crossing system of claim 1, further comprising:

a termination shunt installed together with an insulated joint on rails of a track.

14. The grade crossing system of claim 13, wherein the termination shunt is configured as a 50 Hz or 60 Hz narrow band shunt.

* * * * *